United States Patent [19]
Dent

[11] Patent Number: 5,751,762
[45] Date of Patent: May 12, 1998

[54] MULTICHANNEL RECEIVER USING ANALYSIS BY SYNTHESIS

[75] Inventor: Paul W. Dent, Stehags, Sweden

[73] Assignee: Ericsson Inc., Research Triangle Park, N.C.

[21] Appl. No.: 601,768

[22] Filed: Feb. 15, 1996

[51] Int. Cl.[6] .................. H04B 15/00; H04K 1/00; H04L 27/30
[52] U.S. Cl. ...................................... 375/200; 375/346
[58] Field of Search .................. 375/20 V, 329, 375/346, 348; 4556/115

[56] References Cited

U.S. PATENT DOCUMENTS

| | | |
|---|---|---|
| 4,287,475 | 9/1981 | Eaton et al. . |
| 4,689,804 | 8/1987 | Srinivasagopalan et al. ............ 375/99 |
| 4,894,842 | 1/1990 | Broekhoven et al. ........................ 375/1 |
| 4,991,165 | 2/1991 | Cronyn . |
| 5,048,059 | 9/1991 | Dent . |
| 5,148,373 | 9/1992 | Dent . |
| 5,151,919 | 9/1992 | Dent . |
| 5,193,223 | 3/1993 | Walezak et al. ........................ 455/115 |
| 5,371,853 | 12/1994 | Kao et al. .............. 395/2.32 |
| 5,377,183 | 12/1994 | Dent ........................... 370/18 |
| 5,406,587 | 4/1995 | Horwitz et al. ........................ 375/346 |
| 5,455,844 | 10/1995 | Ishikawa et al. ........................ 375/232 |
| 5,461,643 | 10/1995 | La Rosa et al. ........................ 375/329 |

FOREIGN PATENT DOCUMENTS

| | | |
|---|---|---|
| 491 668 | 6/1992 | European Pat. Off. . |
| 639 007 | 2/1995 | European Pat. Off. . |

*Primary Examiner*—Stephen Chin
*Assistant Examiner*—Mohammad Ghayour
*Attorney, Agent, or Firm*—Burns, Doane, Swecker & Mathis, L.L.P.

[57] ABSTRACT

A method and apparatus for employing negative feedback in a signal processing system to improve the range of signal levels that can be processed is disclosed. First, a feedback signal is subtracted from an input signal to form a difference signal. The difference signal is then analyzed to resolve the difference signal into a number of constituent error components of reduced bandwidth. The error components are then used to refine estimation of corresponding reduced bandwidth constituents of the input signal. The estimates are then used to produce the feedback signals.

22 Claims, 6 Drawing Sheets

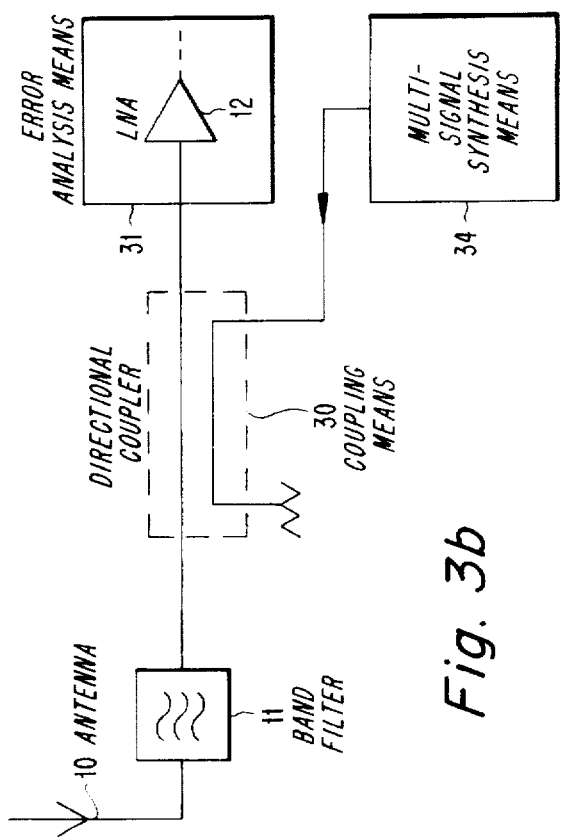
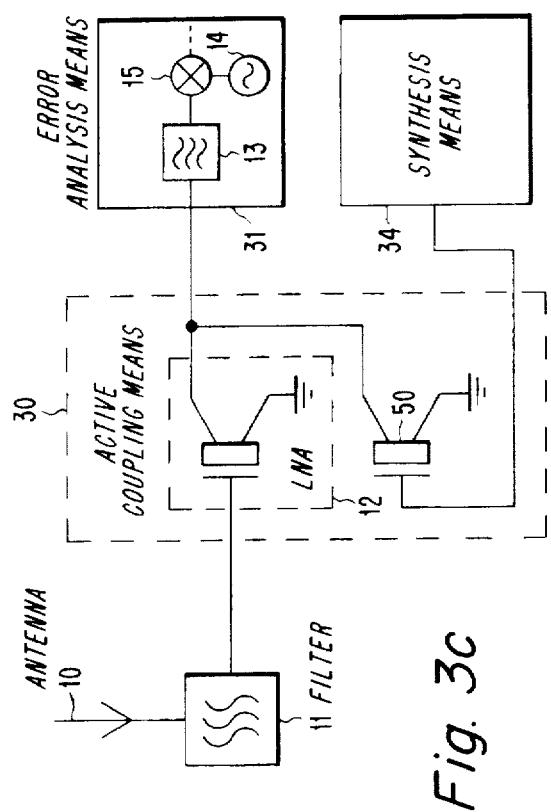
Fig. 3b
Fig. 3c
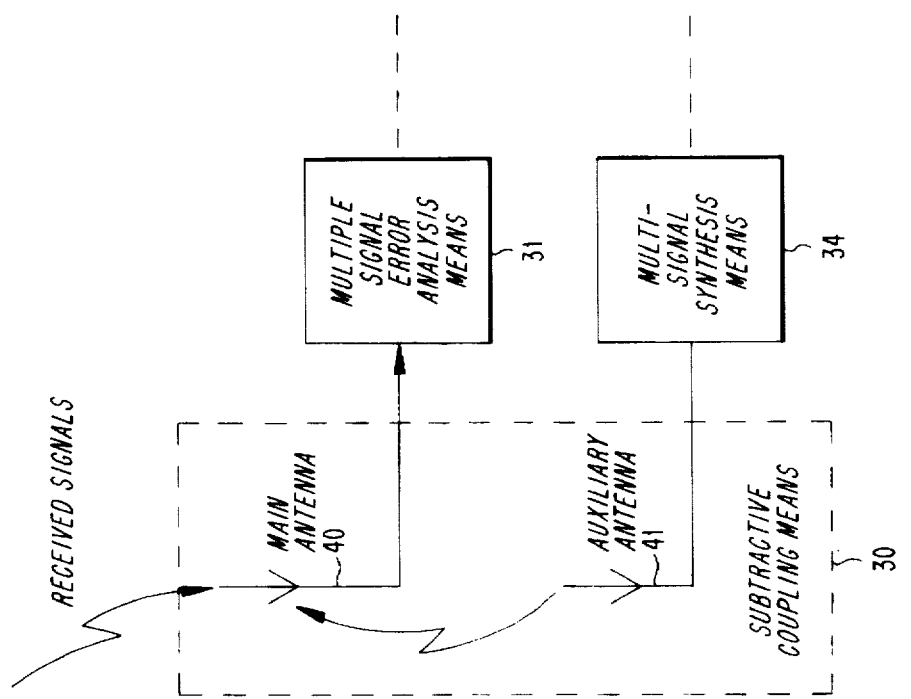
Fig. 3a

MULTICHANNEL RECEIVER USING ANALYSIS BY SYNTHESIS

FIELD OF THE DISCLOSURE

The invention relates to radio receiving systems for multiple independent signals, such as cellular radio telephone base stations, landmobile radio stations and communications satellites.

BACKGROUND OF THE DISCLOSURE

The most usual form of a multi-channel receiving system uses one receiver chain per frequency channel to be received, for example a superheterodyne receiver. The prior art contains examples of sharing components between several receiver processing chains, and in particular a shared antenna may be used, as well as a shared, broadband, low-noise antenna distribution amplifier which amplifies the sum of the multiple received signals and then splits the amplified result between separate receiving chains. The distribution of TV signals to apartments within an apartment building from a communal antenna is one example of this technique.

The prior art also contains examples of a single receiver chain which processes signals from multiple transmitters received sequentially in time by Time Division Multiple Access (TDMA), or alternatively received simultaneously and overlapping in the case of Code Division Multiple Access (CDMA). A disadvantage of the latter over the former is that signals must be received at more or less the same strength in order to avoid interfering with each other too much. The latter disadvantage is overcome by using the technique of subtractive demodulation disclosed in U.S. Pat. No. 5,151,919 in which strong signals are demodulated first and then subtracted out before attempting to process weaker signals.

A true multi-signal receiver according to known art is illustrated in FIG. 1. Multiple signals are received at an antenna 10, and processed by a bandpass filter 11 at a desired frequency band. The signals are then amplified by a low noise amplifier 12 and further filtered to remove image frequency signals in a filter 13. The filtered signals are downconverted in a downconvertor 16 by mixing in a mixer 15 with a signal from a local oscillator 14 to produce an intermediate frequency signal more convenient for further processing. The intermediate signal is further filtered using an I.F. bandpass filter 17 and then amplified in a logarithmic amplifier-detector circuit 18 to produce a hardlimited signal and an instantaneous Radio Signal Strength Indication (RSSI) related to the logarithm of the instantaneous multi-signal amplitude. The hardlimited output signal may be converted to a stream of numerical samples related to instantaneous multi-signal phase using a convertor 20 which may alternatively employ direct phase digitization according to U.S. patent application Ser. No. 07/501,766, or after low pass filtering in a filter 19 to remove harmonics the now relatively constant amplitude sine wave signal may be quadrature sampled and Analog to Digital converted to produce the phase-related signals SIN($\Phi$) and COS($\Phi$) in digital sampled form. The RSSI signal is meanwhile digitized using an AtoD convertor 21 and the logamplitude and phase-related signals are applied to a digital channelization processor. The technique of digitizing an arbitrary signal by digitizing phase related signals and amplitude related signals is described in U.S. Pat. No. 5,048,059 and is incorporated herein by reference. The logpolar technique is specifically designed to allow signals of any instantaneous amplitude to be faithfully converted to digital form with constant percentage accuracy, without having to anticipate their level in order to set amplifier gains using feedback of an Automatic Gain Control signal (AGC). Thus, the prior art logpolar technique is specifically conceived to facilitate an exclusive feedforward architecture for signal receiving systems, in contrast to the current invention which seeks to maximize the use of feedback signals.

In the prior art, a digital channelization processor 22 has the task of analyzing the composite received signal in order to separate out signals on different channel frequencies having different modulation. Disparity in levels between these separate signals is one of the main technical challenges in producing a multi-channel receiver according to the prior art illustrated in FIG. 1. Analog-to-digital conversion techniques have a finite precision which limits the dynamic range of the largest signal that can be represented while the smallest signal that can be represented depends on the number of least significant bits used. When both a large and a small signal are simultaneously present at the antenna, the large signal will dominate the use of bits of precision while the smaller signal may only occasionally change a least significant bit. The finite precision also causes the phenomenon of quantizing noise, and quantizing noise will be determined by the numerical precision and the largest signal that has to be accommodated, and may drown out a weak signal if the signal level disparity is too great or the precision inadequate.

The digital channelization processor 22 also has to provide adequate discrimination of a large signal from a small signal that may be occupying an adjacent frequency channel. This so-called adjacent channel selectivity is a function of the complexity of the multi-channel bandpass filtering operation that the processor 22 numerically performs. In principle, a multi-channel filter which separates a composite, multi-frequency signal into its constituent, single-frequency signals performs a Fourier Transform. It is possible to employ the well-known computationally-efficient Fast Fourier Transform (FFT) algorithm for this purpose. The FFT algorithm operates on blocks of samples corresponding to a time span of at least one over the frequency resolution required. However, transforming blocks of this minimum length does not in the prior art provide good adjacent channel selectivity. It can be shown mathematically that the selective filter which is effectively formed to separate out each individual signal has a frequency selective response curve that is itself the Fourier transform of a weighting function that is applied to samples across the sample block used. It can be shown further that the selective frequency response curve attains sharper degrees of selectivity only when the block length processed is extended so that said weighting function can truncate or tail-off to zero towards the edges of the block in a smooth fashion. The longer the time span of the weighting function tails, the sharper will be the frequency selectivity curve and vice-versa. Thus, an FFT algorithm must be designed to process a much larger block than the minimum length in order to provide acceptable adjacent channel selectivity, increasing system cost.

The above disadvantages of the prior art are overcome by practicing the invention described herein.

SUMMARY OF THE DISCLOSURE

According to conventional thinking, a receiving system comprises receiving signals at an antenna, filtering, amplifying them and converting them possibly to numerical form before demodulating and decoding them using digital logic circuits. In this approach, signals flow in a forward direction from antenna to final output, with the result of one processing stage being fed forward to the next.

The present invention departs from the conventional approach in order to obtain performance and cost advantages through use of a novel technique in which signals flow from the output of the system towards the antenna, the technique being called "analysis by synthesis". Analysis by synthesis is a form of multiple feedback in which a fed back signal computed from estimates of multiple signals is subtracted from the actually received signal, for example by radiating it in antiphase so that it cancels the signals received at the antenna. Any uncancelled components of the signal received at the antenna are then identified by Fourier analysis for example, and used to update the multiple signal estimates. The continuously corrected multiple signal estimates are then output for further processing such as demodulation and decoding.

The invention derives its advantages from reduction of received signal levels to a low, uniform level (the error signal) which can be amplified and processed without needing high dynamic range circuitry.

According to one embodiment of the present invention, a method of employing negative feedback in a signal processing system to improve the range of signal levels that can be processed is disclosed. First, a feedback signal is subtracted from an input signal to form a difference signal. The difference signal is then analyzed to resolve the difference signal into a number of constituent error components of reduced bandwidth. The error components are then used to refine estimation of corresponding reduced bandwidth constituents of the input signal. The estimates are then used to produce the feedback signals.

According to another embodiment of the present invention, a receiving system for multiple radio signals is disclosed. The system comprises means for receiving the radio signals. Subtractive coupling means couple a feedback signal in opposition to the received signals to produce a residual signal. Signal analysis means resolve the residual signal into a number of constituent components. Signal estimating means use the resolved constituent components to refine estimates of corresponding constituent components of the radio signals. Finally, signal synthesis means use the estimates to produce the feedback signal.

BRIEF DESCRIPTION OF THE DRAWINGS

The present invention will now be described in more detail with reference to the preferred embodiments of the invention given only by way of example, and illustrated in the accompanying drawings, in which:

FIGS. 3(a)-3(c) show alternative means of coupling a synthesized signal with received signals to form an error signal according to one embodiment of the present invention;

DETAILED DESCRIPTION

Figure 2:
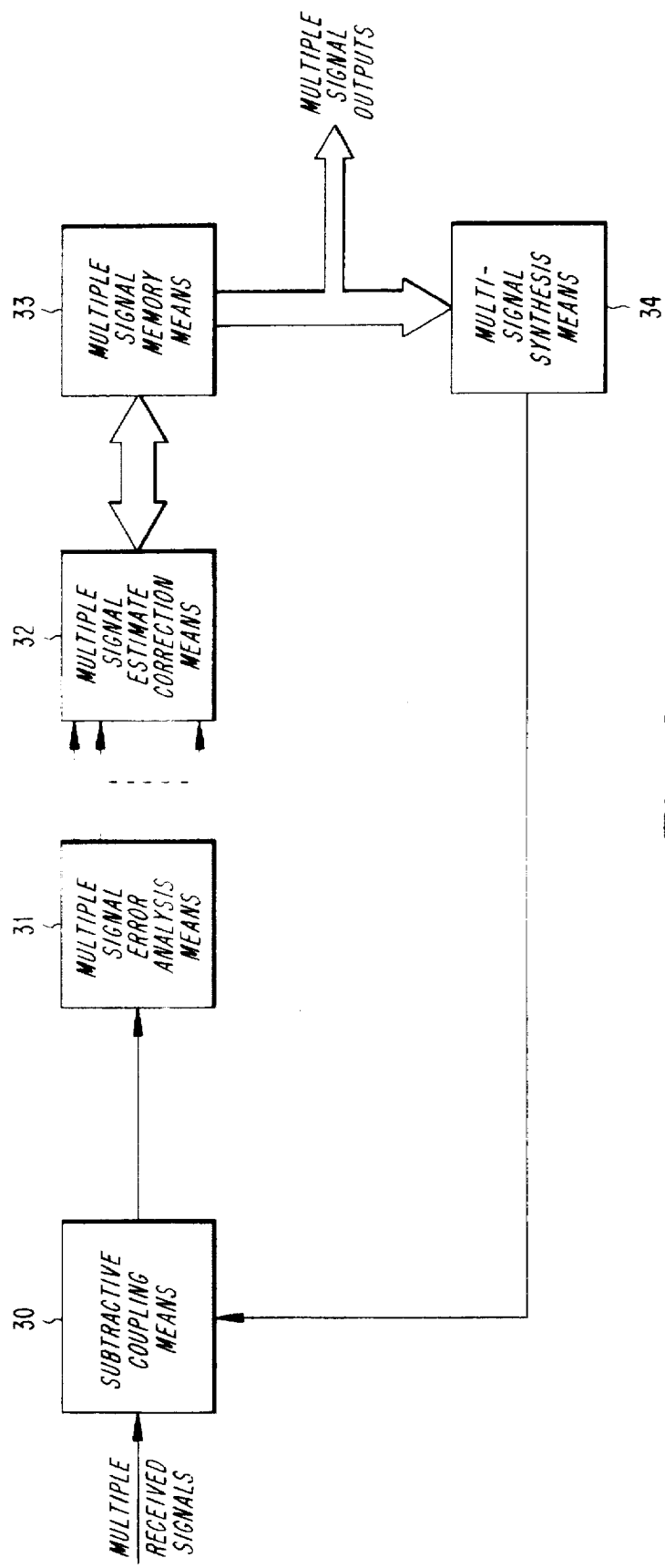
FIG. 2 shows the general block diagram of an analysis-by-synthesis receiver according to the invention.

Referring now to FIG. 2, the basic principles of the invention will be described. FIG. 2 shows reception of multiple received signals into a subtractive coupling device 30. The coupling device 30 subtracts from the received signals a multi-signal waveform produced by a signal synthesizer 34 to leave a residual error signal which is analyzed by a multiple signal error analyzer 31. If, for example, a 30 MHz bandwidth somewhere in the radio spectrum is divided into for example 1000, 30 KHz wide channels, potentially a signal from a different transmitter can be received in each channel. Each signal is assumed to be located with a reasonable degree of precision in the center of each channel, but its spectrum may be spread to occupy the whole of its allocated 30 KHz channel by amplitude modulation, phase angle modulation, or a combination of both. For example, the modulation might comprise frequency modulation by an analog speech signal according to the U.S. AMPS cellular standard, or Pi/4-DQPSK modulation varying in both phase and amplitude according to U.S. Digital Cellular standard IS-54. In all of these cases however, the modulation effects change in each narrowband, 30 KHz wide signal at a relatively slow rate compared to the entire 30 MHz bandwidth of the receiving system. Thus, a phase and amplitude estimate of each signal need only be updated in principle approximately every 30 uS in order to follow the modulation changes. However, the present invention comprises updating the estimates at a greater rate than the minimum rate in order to obtain accurate tracking.

The current estimates of the phase and amplitude of each signal are held in a memory 33. Whether the signal estimates are held in polar form (amplitude and phase), the aforementioned Logpolar form (logamplitude and phase), Cartesian X,Y or I+jQ form or some other complex number representation is a matter of design choice. There is thus a complex number memory location in the memory 33 corresponding to every channel frequency. It can also be advantageous to store and update estimated time derivatives of the stored complex numbers, for example (dI/dt,dQ/dt); (dA/dt, dPHI/dt) or any combination of these and their higher order derivatives.

The multiple signal error analyzer 31 resolves the residual signal from the subtractive coupling device 30 into error frequency components at every one of the channel frequencies and revolves each frequency component into its complex parts, e.g. real and imaginary parts or amplitude and phase related parts. This function can be performed by an FFT operation which estimates the amounts of cosine waves and of sine waves centered on each of the channel frequencies that are needed to constitute the current error signal over some analysis window. The minimum analysis window timespan is the reciprocal of the channel spacing, namely approximately 33 uS. A disadvantage of the prior art explained above was that performing Fourier analysis using that minimum length window did not provide adequate discrimination between signals in adjacent frequency channels of disparate level. According to the main principle of this invention however, the Fourier analysis is not applied to received signals of disparate levels but to a residual error signal from which signals of disparate level have been removed or significantly suppressed in the subtractive coupling device 30. Thus, a much simpler, non-windowed FFT may be used for multiple signal error analyzer 31.

Multiple signal estimates held in the memory 33 are updated by a correction device 32 using an analysis of the residual error signal provided by the error analyzer 31. The analyzed error values indicate how much the real and imaginary component at each signal frequency should be adjusted so as to reduce the total energy of the residual signal. Adjusting both the real and imaginary components of a signal forms what is known as a Cartesian control loop. If on the other hand estimates of the phase and amplitude of signals are adjusted, this is known as a polar loop. The invention can thus in one embodiment comprise a multiplicity of Cartesian control loops, one for each constituent frequency channel component of the received band, or in another embodiment can comprise a multiplicity of polar loops.

Alternatively, the approach can be taken to concentrate on minimizing the largest error or errors across the frequency channels, instead of trying to minimize all errors, some of which may already be at noise level. These various approaches are all considered to lie within the scope and spirit of the general invention.

The corrected signal estimates in the memory 33 are made available to the multi-signal synthesizer 34 which uses them to construct a best approximation to the signals in every channel which is valid for the immediate past and future. The approximation will be accurate for some future time equal to a fraction of the reciprocal channel bandwidth but will tend to become inaccurate after a commensurate time equal to the reciprocal of the channel bandwidth. Thus, the invention comprises producing new error analyses and performing updates to the signal estimates at a rate which is a multiple of the channel spacing of 30 KHz, e.g. at 120 KHz or 240 KHz or higher. Of course the use of time derivatives can help the signal synthesizer 34 free-wheel between updates with greater accuracy than if derivatives had not been used.

The signal synthesizer 34 applies each estimate of the real and imaginary part of each signal to determine the amplitude of a corresponding cosine and sine wave centered on their respective channel frequencies, the sum of all of the weighted cosine and sine waves then forming the composite waveform which is fed to subtractive coupling device 30. The signal synthesizer can also perform an inverse FFT operation performed numerically using high speed arithmetic logic circuits. Alternatively it can comprise a Discrete Fourier Transform operation which can compute signal samples on an arbitrarily fine time grid to provide a better approximation to a continuous signal.

The invention described above is a form of negative feedback to reduce the distortion in a signal amplifying means through requiring the amplifying means only to amplify the error between the input signal and a fed back signal. However, a conventional negative feedback amplifier would contribute little to the problem of constructing a multi-signal receiver and very wideband, high-gain feedback systems would be difficult to maintain in stable operation due to delay around the loop. Thus, the invention may be described as a Sub-Band Feedback system which comprises multiple feedback loops each dealing with a small fraction of the signal bandwidth to be processed such that loop delays are only important in relation to the reciprocal of the narrow channel bandwidths and are not important in relation to the entire 30 MHz bandwidth.

FIGS. 3(a)–(c) shows three alternative embodiments of the subtractive coupling device 30 which can be used in the invention, but these do not represent an exhaustive list of possible means. FIG. 3a indicates receiving signals by means of an antenna 40, and reradiating signals using an auxiliary antenna 41 in proximity to antenna 40 such that the antenna 40 receives the radiated signals in opposition to the received signals, forming an error signal which is then processed by the error analyzer 31. The subtractive coupling device 30 can thus comprise the combination of a main receiving antenna 40 and auxiliary re-radiating antenna 41 of FIG. 3(a).

FIG. 3(b) shows receiving signals via an antenna 10 and band-defining filter 11, and then combining the filtered signals with the output of the signal synthesizer 34 using a directional coupler, which in this case is the coupling device 30. A directional coupler forms a combination of the filtered received signals times a voltage weighting factor $$\sqrt{(1-k^2)}$$

with the synthesized signal weighted by k. The value k would be chosen to be small, e.g. 1/30 (a −30 dB coupler) such that the high-level synthesized signals are attenuated to the low level of the unamplified received signals and such that the factor $$\sqrt{(1-k^2)}$$

is very close to unity and thus represents very little attenuation of the received signals. Many forms of directional and non-directional (e.g. resistive) coupling means may be embraced by the general term "conductive coupling means" used to describe FIG. 3(b), in contrast to the radiative coupling means of FIG. 3(a).

Finally, FIG. 3(c) illustrates a form of active coupling means using low-noise amplifying transistors. Signals are received at the antenna 10, and filtered in the band-defining filter 11. The signals are then applied to a low-noise amplifier 12 which in this exemplary case comprises a single field effect transistor. The transistor 12 transforms a signal voltage on its gate input into a proportional current at the drain terminal of the transistor 12. The output voltage of synthesizer 34 is also converted to a current using a similar FET 50, the output current of which is combined with that from the transistor 12 by paralleling the drain terminals. The synthesized current opposes the received signal current to give a residual error current which is analyzed by error analyzer 31 which can comprise further filtering, amplification and downconversion in the filter 13, the amplifier 14, and the downconverter 16 which are analogous with those shown for the prior art in FIG. 1.

Figure 1:
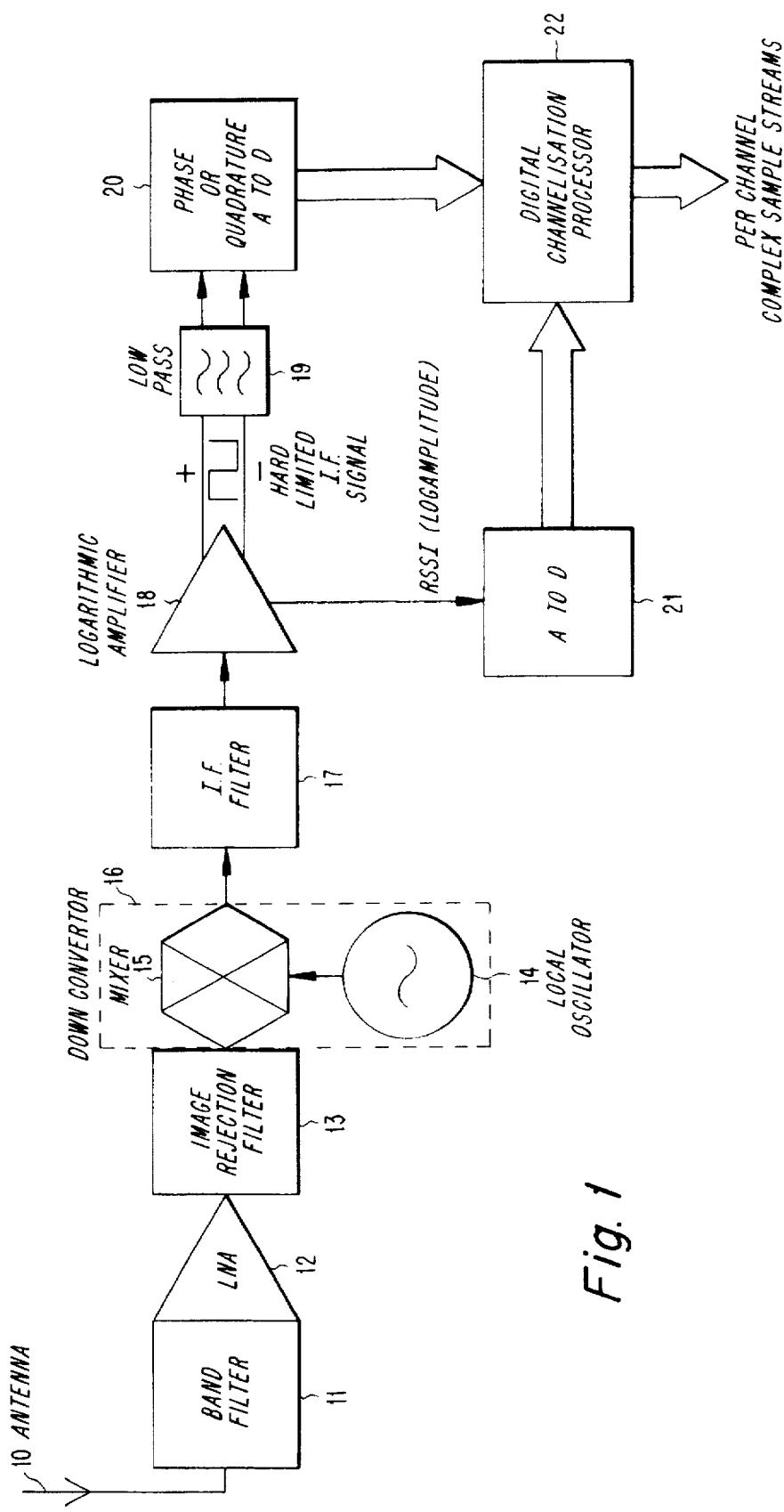
FIG. 1 illustrates a prior art multi-signal receiver.
Figure 4:
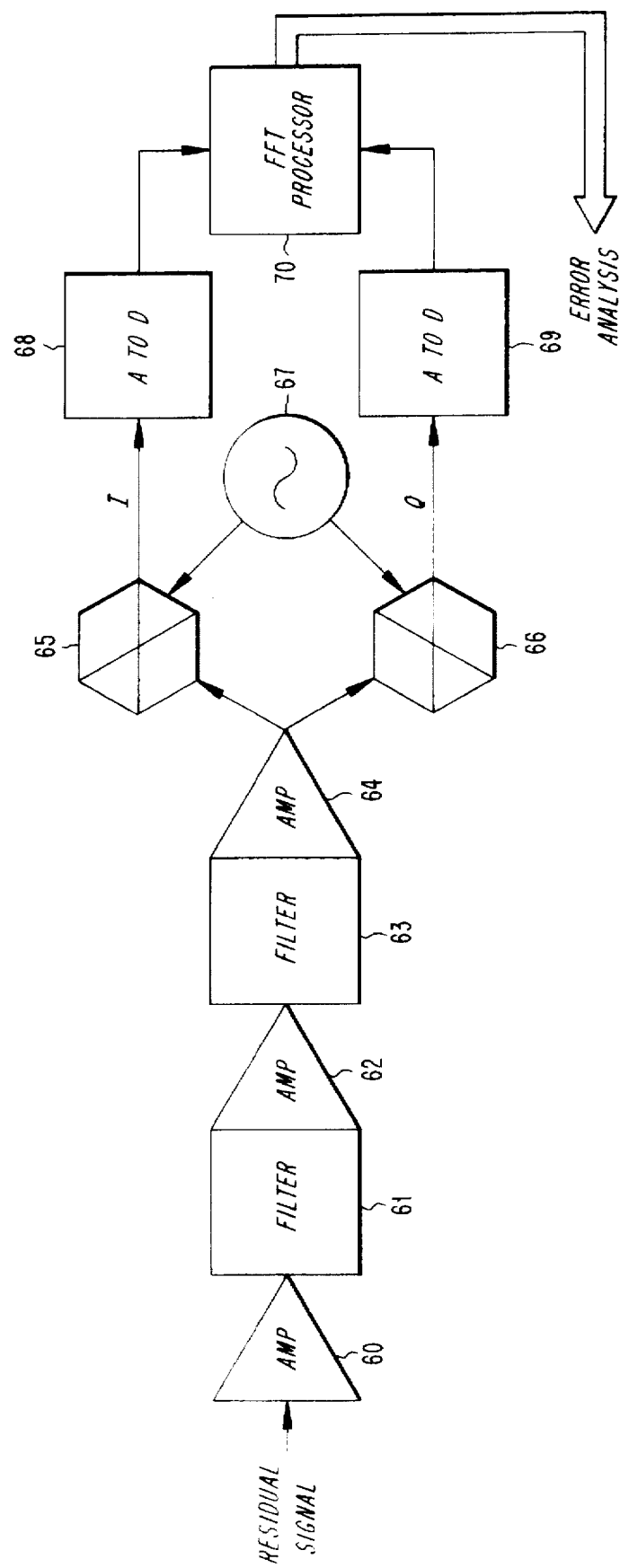
FIG. 4 shows an error analysis section according to one embodiment of the present invention.

The prior art arrangement of FIG. 1 can in fact be employed as the error analyzer 31, but alternatives are permitted by the invention due to the suppression of strong signals. FIG. 4 shows a block diagram that is now permitted when practicing the invention that would not have functioned satisfactorily in the case of the prior art due to dynamic range limitations.

The residual signal is amplified and filtered successively using amplifiers 60,62,64 and filters 61,63 to raise the error signal level from a noise level to a convenient signal level for digitizing, such as −20 dBm. The output of the final amplifier stage 64 is mixed in quadrature mixers 65,66 with cosine and sine waves from a quadrature local oscillator 67 operating at a center frequency in the middle of the frequency band of the receiving system. Preferably, local oscillator 67 has a center frequency which is also midway between two frequency channels near the center of the band. The output signals I and Q from mixers 65,66 each have a bandwidth extending from zero to half the total bandwidth, and these signals are then sampled at the Nyquist rate of at least twice the maximum frequency, that is a sample rate at least equal to the channel bandwidth, and then digitized using A-to-D convertors 68,69. Since the error signal is nominally zero, the A-to-D convertors 65,66 do not have large variations in signal level to contend with and thus need only limited resolution, for example 4–8 bits. The stream of digitized I,Q values is fed to FFT processor 70 which collects blocks of complex samples, for example 1024 successive samples, for processing to analyze the error signal.

For example, suppose the total signal bandwidth to be analyzed is approximately 30 MHz, the I,Q sampling rate is 30.72 MHz and 1024-sample blocks are analyzed. The analyzed results then describe the error signal energy in each 30 KHz bandwidth segment (i.e. frequency channel) of the composite signal. Such an analysis is made every 33.333 uS if successive blocks are not overlapped. However, overlapping successive blocks or 1024 samples permits updates to the error analysis to be made more frequently, which is advantageous. Since a fully parallel digital logic construction of a 1024-point FFT machine can be realized that performs a 1024-point analysis in the time it takes to apply the I,Q data bit-sequentially least-significant bit first to the input, there is in practice no limitation to overlapping analyses every 32 samples and thus obtaining error analyses at just over 1 uS intervals.

The error analysis consists, for each of the 1024 frequency bins, of an I-error and a Q-error. Errors are preferably corrected by updating, for each bin, an I-derivative and a Q-derivative which determine the rate at which previous I and Q values shall be increased or decreased. This forms a second order feedback system for correcting each I,Q value, but first order feedback systems can be made without derivatives or higher order feedback control systems can also be devised using second order or higher derivatives.

Figure 5:
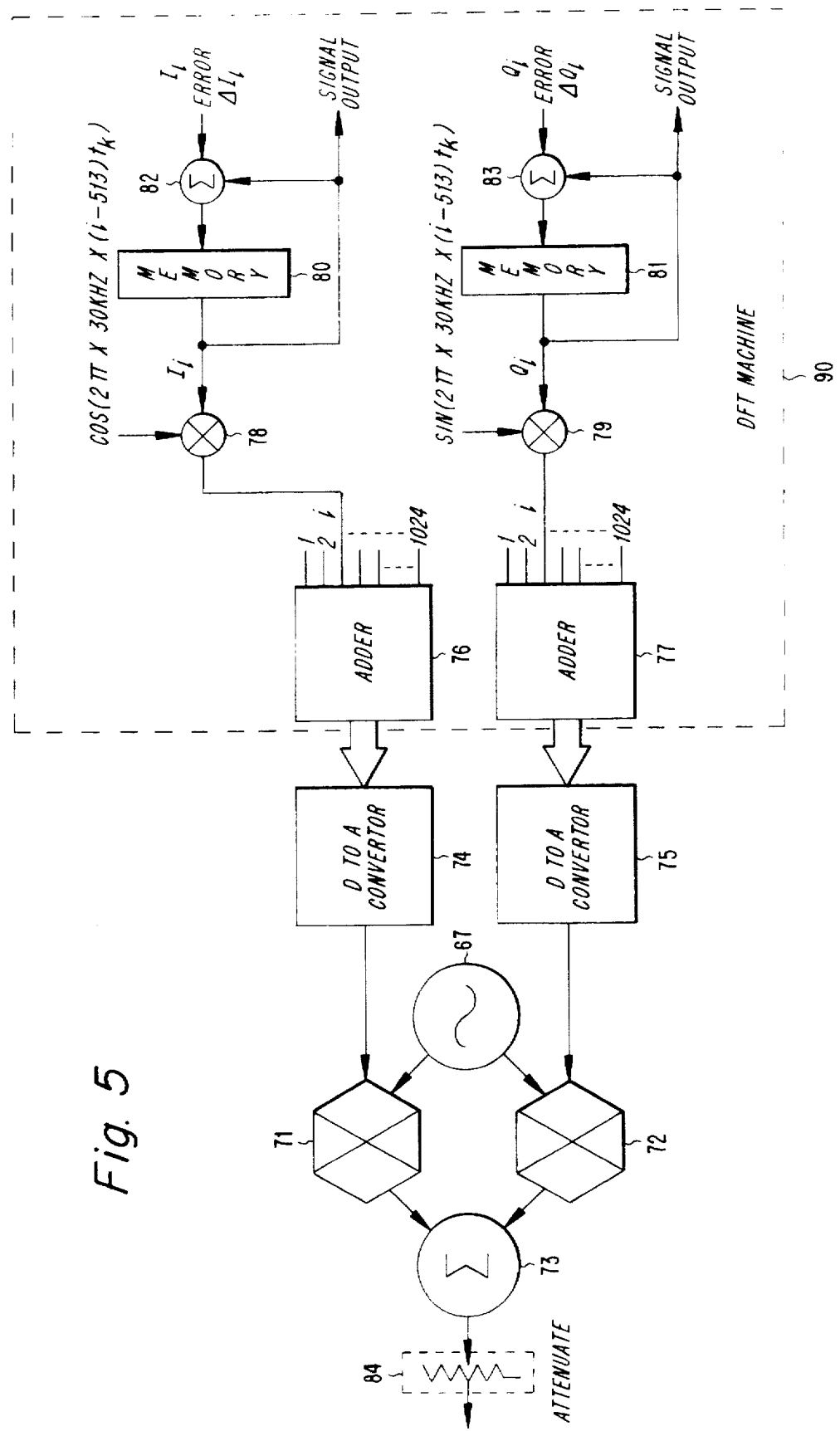
FIG. 5 shows a signal synthesis section according to one embodiment of the present invention.
Figure 6:
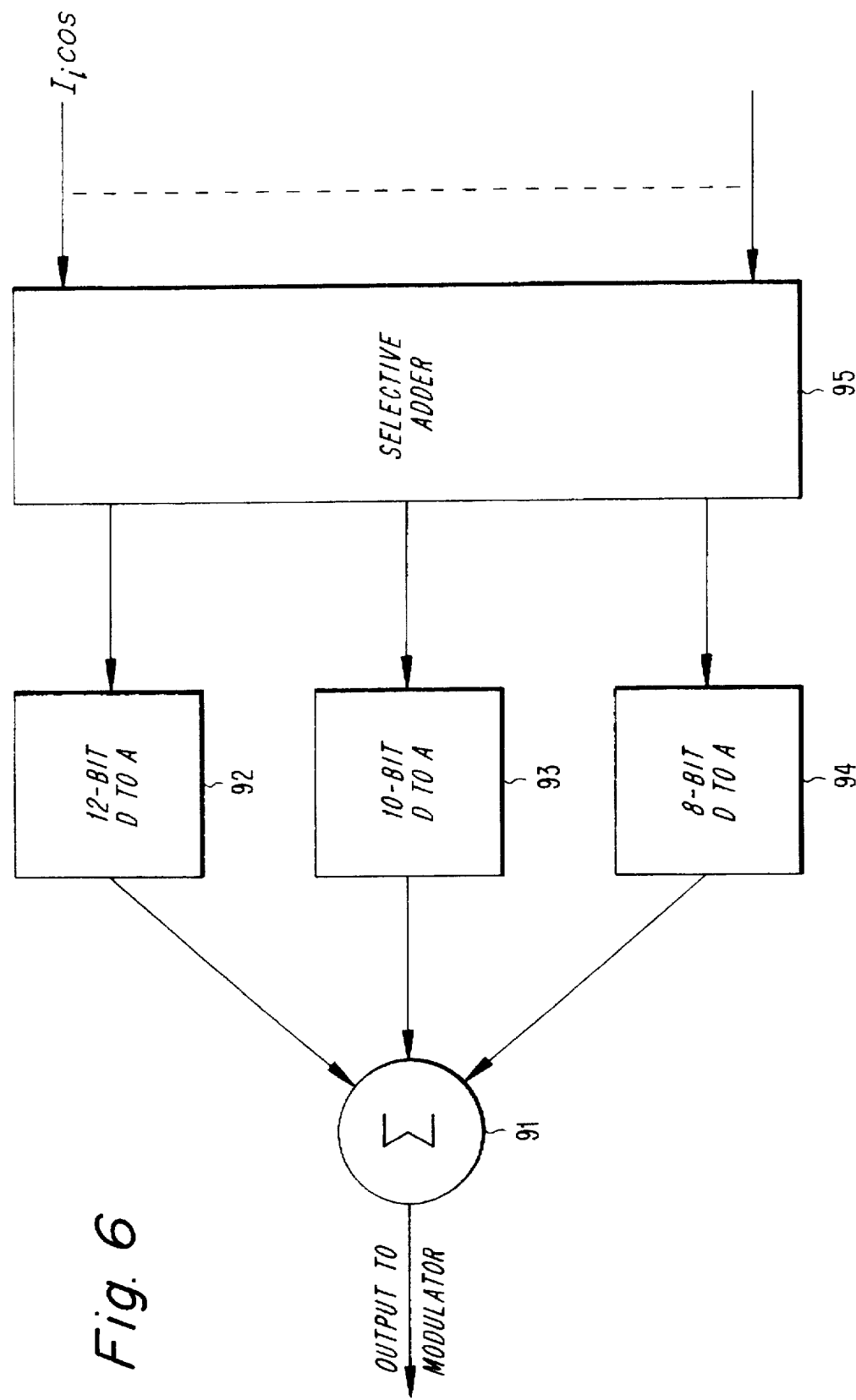
FIG. 6 shows an improved D to A conversion method according to one embodiment of the present invention.

FIG. 5 illustrates a signal synthesizer using first order control of I,Q signal estimates. Analyzed errors enter a DFT machine 90 as digital values dIi,dQi and are applied to I and Q adders 82,83 along with previous I,Q values to increment or decrement the stored values Ii,Qi in memory registers 80,81. The corrected values Ii,Qi are then applied to multipliers 78,79 where they multiply digitized samples of a cosine waveform and a sine waveform respectively selected from a stored table or memory (not shown). The multiplied values from all I multipliers 78 are added in I-adder 76 and Q values are added in adder 77 before being D-to-A converted in D-to-A convertors 74,75. The D-to-A convertors must have the full dynamic range expected of the synthesized signal, that is of the composite received signal, however constructing high dynamic range D-to-A convertors is easier than constructing high dynamic range A-to-D convertors. Some inventive techniques that can be applied to construct D-to-A convertors with improved performance suitable for use in this invention will later be described with the aid of FIG. 6.

The D-to-A converted composite I,Q signals are then applied to quadrature modulators 71,72 along with quadrature local oscillator signals which preferably derive from the same local oscillator 67 as used for downconversion. The sum of the modulator output signals is formed with adder 73 which may consist merely of a parallel connection of current source outputs from the modulators 71,72. The modulated signal is generated at high levels, for example −10 dBm, and thus must be attenuated for subtractive coupling with received signals so that the levels match. This is accomplished using an attenuator 84 and by choice of the coupling coefficient in the coupling device 30. The overall attenuation provided beneficially attenuates also noise produced by the signal synthesis process, such as quantizing noise of D-to-A convertors 74,75.

The I or Q values Ii, Qi multiplied by respective cosine or sine values in multipliers 78 or 79 are coupled to a selective adder 95. The selective adder 95 selects values of similar magnitude categorized into three magnitude groups to be added. The magnitude category of a value is determined by the highest non-zero bit of significance, that is, in two's complement notation, the first bit encountered in descending order of bit significance which is of an opposite polarity to the bits of higher significance. The selective adder 95 sequentially scans each of the 1024 multiplied values and adds each to one of three accumulators depending on its magnitude. For example, assuming all multiplied I values to be of 8-bit length, those having bit 6 or greater of non-zero significance would be added to a first accumulator; those having bit 4 or 5 of non-zero significance would be added in a second accumulator, and those having only bits 3 or less of non-zero significance would be added in a third accumulator. The three accumulator contents are then D-to-A converted using respectively convertors of 12-bit resolution 92, 10-bit resolution 93 and 8-bit resolution 94. The three D-to-A convertors' analog output signals are then added in a summer 91. Many variations of the above can be made by a person skilled in the art, such as using D-to-A convertors with the same number of bit resolution, e.g. 12, and scaling their outputs before adding in the summer 91. Such variations may also encompass for example selecting only the largest 16 Ii or Qi values to be summed to a first D-to-A convertor, the next 128 in magnitude order to be summed to a second D-to-A convertor, and the remainder to a third D-to-A convertor.

A further variation is to associate separate quadrature modulators with each of the separate A-to-D convertors and to add their respective analog outputs in suitable fixed scaled ratios.

The above description has concentrated on resolving a spectrum into a number of constituent frequency channels each containing and independent signal. However, it is alternatively possible to resolve a signal into other sets of orthogonal waveforms such as Walsh-Hadamard functions. It is also possible to use the invention for receiving direct sequence spread spectrum signals that have to be resolved by correlating received signals with a number of spreading codes. The analysis means 31 can thus comprise correlation with a number of spread spectrum access codes, while the signal synthesizer can comprise generation of a number of spread spectrum synthesis codes. In this case multiple signal estimate correction means 32 can comprise not only correcting the complex weighting factor for each particular code but also comprising correcting a time delay of said code using a delay-lock loop. Alternatively, the complex amounts of different time-shifts of each code corresponding to delayed echoes or uncalibrated system delays can be stored and independently updated.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A receiving system for multiple radio signals, comprising:

means for receiving said radio signals;

subtractive coupling means for coupling a feedback signal in opposition to said received signals to produce a residual signal;

signal analysis means for resolving said residual signal into a number of constituent components;

signal estimating means for using said resolved constituent components to refine estimates of corresponding constituent components of said radio signals; and signal synthesis means for using said estimates to produce said feedback signal.

2. A system according to claim 1, wherein said constituent components comprise signals modulated on different channel frequencies.

3. A system according to claim 1, wherein said constituent components comprise signals coded with different spread spectrum codes.

4. A system according to claim 1, wherein said constituent components comprise signals modulated on different channel frequencies and spread with different direct sequence spreading codes.

5. A system according to claim 1, wherein said means for receiving said radio signals comprises an antenna or antenna array.

6. A system according to claim 5, wherein said subtractive coupling means comprises an auxiliary radiating antenna in proximity to said receiving antenna means.

7. A system according to claim 1, wherein said subtractive coupling means comprises a directional coupler.

8. A system according to claim 1, wherein said subtractive coupling means comprises active coupling means using low-noise amplifier devices.

9. A system according to claim 8, wherein said active coupling means comprises combining the outputs of two amplifier devices in opposition.

10. A system according to claim 1, wherein said signal analysis means comprises analog to digital conversion means.

11. A system according to claim 10, wherein said signal analysis means further comprises numerical Fourier Transform means.

12. A system according to claim 1, wherein said estimating means comprises multiple Cartesian control loops.

13. A system according to claim 1, wherein said estimating means comprises multiple polar loops.

14. A system according to claim 1, wherein said signal synthesis means includes a numerical discrete Fourier transform performed by digital logic.

15. A system according to claim 1, wherein said signal synthesis means comprises a quadrature modulator.

16. A system according to claim 1, wherein said signal synthesis means performs an inverse Fast Fourier Transform operation using high speed arithmetic logic circuits.

17. A system according to claim 1, wherein said signal analysis means further comprises:
   amplifying and filtering means for raising said residual signal to a convenient level;
   quadrature downconversion means for converting said amplified residual signal to baseband I and Q signals, and
   two-channel analog to digital conversion means for converting said I and Q signals to corresponding sequences of numerical samples.

18. A system according to claim 1, wherein said signal analysis means comprises means to convert said residual signal to a representative sequence of complex numerical samples.

19. A method of employing negative feedback in a signal processing system to improve the range of signal levels that can be processed, comprising the steps of:
   subtracting a feedback signal from an input signal to form a difference signal;
   analyzing said difference signal to resolve the difference signal into a number of constituent error components of reduced bandwidth;
   using said error components to refine estimates of corresponding reduced bandwidth constituents of said input signal, and
   using said estimates to produce said feedback signal.

20. A method according to claim 19, wherein said constituent components comprise signals modulated on different channel frequencies.

21. A method according to claim 19, wherein said constituent components comprise signals coded with different spread spectrum codes.

22. A method according to claim 19, wherein said constituent components comprise signals modulated on different channel frequencies and spread with different direct sequence spreading codes.

* * * * *